US010972711B2

(12) United States Patent
Hamilton (10) Patent No.: US 10,972,711 B2
(45) Date of Patent: Apr. 6, 2021

(54) METHOD OF DETERMINING THE BOUNDARY OF A DRIVEABLE SPACE

(71) Applicant: TRW Limited, Solihull (GB)

(72) Inventor: Oliver Kendal Hamilton, Chester-le-Street (GB)

(73) Assignee: TRW Limited, Solihull (GB)

( * ) Notice: Subject to any disclaimer, the term of this patent is extended or adjusted under 35 U.S.C. 154(b) by 0 days.

(21) Appl. No.: 16/210,399

(22) Filed: Dec. 5, 2018

(65) Prior Publication Data

US 2019/0182467 A1  Jun. 13, 2019

(30) Foreign Application Priority Data

Dec. 6, 2017 (GB) ..................................... 1720360

(51) Int. Cl.
H04N 13/00 (2018.01)
G06K 9/00 (2006.01)
G06T 7/593 (2017.01)

(52) U.S. Cl.
CPC ......... *H04N 13/00* (2013.01); *G06K 9/00026* (2013.01); *G06K 9/00791* (2013.01); *G06T 7/593* (2017.01); *H04N 2013/0074* (2013.01)

(58) Field of Classification Search
CPC ............ G06K 9/00026; G06K 9/00791; G06T 7/593; H04N 13/00; H04N 2013/0074
See application file for complete search history.

(56) References Cited

U.S. PATENT DOCUMENTS 9,242,601 B2    1/2016 You et al.
2013/0251193 A1*  9/2013 Schamp ................ G06T 7/593
                                                382/103

(Continued)

FOREIGN PATENT DOCUMENTS

EP    2713309 A2    4/2014
EP    3057063 A1    8/2016

OTHER PUBLICATIONS

Oniga et al., "Fast Obstacle Detection Using U-Disparity Maps with Stereo Vision", IEEE, (2015), pp. 203-207.*

(Continued)

*Primary Examiner* — Mohammed S Rahaman
(74) *Attorney, Agent, or Firm* — MacMillan, Sobanski & Todd, LLC (57) ABSTRACT

A method of determining the characteristics of a scene around a vehicle comprises capturing a stereo pair of images of the scene and processing the images to produce a depth map of the scene. Each pixel in the depth map is assigned a value that corresponds to the range of a corresponding region in the scene, the pixels being arranged in a grid of rows and columns with each column of pixels in the grid corresponding to a vertically oriented set of regions in the scene and each row a horizontally oriented set of regions in the scene. The values for one or more columns of pixels in the depth map are binned to form a corresponding histogram, each bin in the histogram having a count value that corresponds to the number of pixels in the column that have a depth within the range assigned to the bin. The or each of the range bin histograms are processed to determine for the or each histogram the lowest range bin that is indicative that an object that represents a non-drivable region is present at a depth that lies in the range of depths assigned to the bin, thereby identifying the location of one or more boundary points that lie on a boundary of a drivable space in the scene.

8 Claims, 10 Drawing Sheets

(56) References Cited

U.S. PATENT DOCUMENTS

2014/0086477 A1* 3/2014 You ................ B60W 40/06
                                                382/154
2016/0253575 A1* 9/2016 Kakegawa ........... G08G 1/165
                                                701/70

OTHER PUBLICATIONS

Hu et al., "U-V-Disparity: An efficient algorithm for Stereovision Based Scene Analysis", IEEE, (2005), pp. 48-54.
European Search Report, Application No. 18210283.0, dated Apr. 29, 2019.
GB Patents Act 1977: Search Report under Section 17(5), Application No. GB1720360.5, dated Feb. 28, 2018.

* cited by examiner

METHOD OF DETERMINING THE BOUNDARY OF A DRIVEABLE SPACE

CROSS-REFERENCE TO RELATED APPLICATIONS

This application claims priority to Great Britain Patent Application No. 1720360.5, filed 6 Dec. 2017, the disclosures of which are incorporated herein by reference in entirety.

BACKGROUND TO THE INVENTION

This invention relates to image processing, and in particular to a method of processing an image to determine the characteristics of regions of space around a vehicle, in particular identifying the boundary of a drivable space into which a vehicle may move.

When driving a vehicle on a highway or off-road, it is essential that the driver of the vehicle is able to avoid hitting other objects. Examples of typical objects in a road environment are other cars and walls and street furniture. For a well-trained driver, having passed a driving standards test, this is generally a simple task as humans generally have excellent spatial awareness.

It is known to provide a driver aid which alerts the driver if they are approaching an object which cannot be driven over. A common example of such a driver aid is a parking aid which may be fitted to a vehicle and which uses ultrasound to measure the distance between the vehicle and a raised object. An audible warning may then be issued if the driver is getting too close to the object, and in some cases a visual warning may also be issued. By fitting multiple sensors at spaced locations around the vehicle it is possible to provide a visual warning that shows the driver the approximate location of the object. These driver aids are relatively low cost and reliable but can only detect objects which will reflect a strong signal back towards the vehicle. This limits their use to low speed maneuvers and to detecting objects which are relatively close to the vehicle, and whilst useful they cannot be totally relied upon to identify all objects as some may not generate a strong reflection that is directed back to the vehicle.

Advances in technology mean that autonomous vehicles and semi-autonomous vehicles are being developed which have no driver or may self-drive under limited circumstances which rely on information captured by sensors fitted to the vehicle to determine where it is safe for the vehicle to move to. These vehicles must be able to plot a safe path for the vehicle at both low speeds and at high speeds, and should ideally be able to work in all environments.

It would therefore be desirable to provide a versatile apparatus and method of detecting regions of drivable space. This may, in some instances, provide information that will be suitable for use by an autonomous or semi-autonomous vehicle when plotting a course of action for the vehicle as it moves through a scene.

SUMMARY OF THE INVENTION

In this description the term drivable space is used to refer to a substantially flat, typically horizontal surface which vehicles normally drive on (e.g. safe surfaces such as road, carpark, driveways, as well as relatively flat off-road spaces). The term prohibited space is used to define a region in a scene around a vehicle beyond where normal drivability ends because there is a vertically projecting object such as a parked vehicle, or a wall, which is too high for the vehicle to pass or represents a manmade feature marking an edge of a prohibited area such as the raised kerb where a road joins a pathway.

According to a first aspect the invention provides a method of determining the characteristics of a scene around a vehicle, comprising:

capturing a stereo pair of images of the scene, processing the images to produce a depth map of the scene in which each pixel in the depth map is assigned a value that corresponds to the range of a corresponding region in the scene, the pixels arranged in a grid of rows and columns with each column of pixels in the grid corresponding to a vertically oriented set of regions in the scene and each row a horizontally oriented set of regions in the scene, binning the values for one or more columns of pixels in the depth map to form a corresponding histogram, each bin in the histogram having a count value that corresponds to the number of pixels in the column that have a depth within the range assigned to the bin, processing the or each of the range bin histograms to determine for the or each histogram the lowest range bin that is indicative that an object that represents a non-drivable region is present at a depth that lies in the range of depths assigned to the bin, and thereby identify the location of one or more boundary points that lie on a boundary of a drivable space in the scene.

By identifying the location of the boundary points we may mean identifying the position of boundary points in a 2D image of the scene, which may be one of the two stereo pair images or a 2D image derived from them. This is useful for producing an overlay of the boundary on a 2D image of the scene.

By careful selection of the number of bins in each histogram and the number of rows in the 2D image that is to be overlaid, it is possible to map the bins onto the rows in the 2D image.

Alternatively by the range bins identifying the location we may mean identifying the location in the scene in a 3D Cartesian space, expressed in terms of both the horizontal position and the range of the boundary point. This can be achieved by relating the bins back to a projection of the 2D image of the scene or the depth map or a composite 2D image onto a 3D plane and mapping the bin onto the 3D plane.

The method of the invention is capable of detecting objects that lie above a 3D plane in front of a moving vehicle fitted with a calibrated stereo camera. The method requires no training data or any forms of machine learning, therefore it is not limited to a given class of objects so is only defined by the size of the objects the system should identify.

To give a most detailed boundary, it is preferred that each column of pixels in the depth map is binned to form a range bin histogram. Similarly, it is preferred that the depth map comprises a deep depth map in which every pixel in the stereo pair of images is processed in generating the depth map.

The method may comprise determining from the set of boundary points a complete boundary that extends across all rows in the depth map, whereby the boundary line represents an edge of a safe drivable space in the scene.

The value of the pixel count may be selected to correspond to regions where an edge of an object is present which is too high for the vehicle to drive past. This height will vary from vehicle to vehicle, but is typically between 10 cm and 20 cm in height. The bin count value that corresponds to this height will depend on the resolution of the stereo cameras, the field of view of the cameras and the number of bins in each histogram.

In a convenient arrangement, a range bin count that exceeds twice the count expected for that bin if the region corresponding to that bin was a flat horizontal plane.

Since regions of the scene that correspond to a flat horizontal plane that are closer to the camera will generate contain a higher range bin count than regions that are further away, the absolute bin count value that corresponds to a flat horizontal plane will vary from bin to bin.

The method may comprise constructing a 2D image of the scene and marking the boundary points or the boundary line onto the 2D image, and presenting the 2D image with the markings on a display screen.

The method may comprise generating a lookup table that relates the image row of the 2D image to the corresponding range bin. This may be performed during the creation of the depth map. Using the look up table it would then be possible to transform a point in the range histogram image back into camera space by using the column index and looking up the corresponding image row for a given range bin from the lookup table. This allows for visually representing the location on the source imagery.

The creation of the look up table may be performed after the boundary of the driveable space has been generated with only regions that lie within the driveable space being used to generate the look up table. This approach may prove more reliable, in particular where there are multiple features in the image at the same range but at different heights above the ground plane.

The method may comprise presenting the overlaid image on a display screen of the vehicle where it can be viewed by a driver of the vehicle.

Alternatively the boundary points may be combined with information about the location of the vehicle and optionally the direction of travel of the vehicle to raise an alert as a function of the distance of the vehicle from the boundary of the drivable space. The distance may be measured in a direction of travel of the vehicle, or forward and rearward of the vehicle. This will ensure that alerts are not raised because the vehicle is close alongside a boundary yet cannot move in such a way as to hit the close boundary.

The step of producing the depth map may comprise creating a depth map using a dense stereo algorithm such as a Semi-Global Block Match (SGBM) algorithm. The SGBM algorithm for generating a depth map is well known, and suitable code may be found in OpenCV open source computer vision software library.

The method of producing the depth map may comprise creating a disparity image from the stereo pair of images in a first step and in a second step projecting the disparity image (D) having a height R (rows) of pixels, and width C (columns) of pixels, to 3D points so as to generate a 3-channel matrix of 3D points (Pt3D) of the same dimensions of R and C so that D(r, c)=>Pt3D(r, c,:);
where:
X depth value=Pt3D(r,c,0);
Y depth value=Pt3D(r,c,1);
Z depth value=Pt3D(r,c,2).

The depth map may then be formed by plotting a 2D matrix of the values Z in the 3D projection of the disparity image where the transformation is based on the Z axis being aligned with the central axis of the camera field of view that captures the stereo image pair.

Other dense stereo algorithms can be used on the proviso they are suitably dense.

To transform the disparity map to the depth map in the real world 3D space, the 3D projection may use information about the configuration of the camera. The method may comprise receiving information about the camera configuration for use in this transformation, in particular the focal length of the camera and its height above the drivable plane.

The step of generating the range bin histogram may comprise scanning through all rows of each column in the depth map and counting the values that fall within a given range-bin, effectively creating a histogram of range, Z.

Each histogram may comprise a set of bins of equal width, although they may have unequal widths. It is preferred to use equal widths, with the width of each bin representing a set range of ranges. For example, each bin may cover a range of 1 metre, or 0.5 metres. The choice of the size of each bin will depend on the resolution of the stereo camera, which in turn sets the number of rows and columns in the captured stereo images.

The set of histograms may be presented as a histogram image, with each histogram defining the values of one column in the histogram image, and with the bins arranged so that the bin corresponding to the lowest range is at the top of the image and the bin corresponding to the highest range is at the bottom. Of course, the histograms may be arranged the other way up in each column.

The step of processing each of the range bin histograms to determine which is the closest range bin which represents non-drivable space may comprise comparing the count value assigned to the bin to a predefined threshold count value assigned to the bin, and flagging that the bin identifies a region in the scene that is non-drivable if the value exceeds the threshold.

As the exact camera pitch may be unknown, instead of calculating a predefined value for the expected number of pixels in a given range-bin based on a set of known camera parameters such the field of view, the camera resolution, the camera height and camera pitch the method may fit a function to the range-bin count of a known flat plane observed in the data and identify a bin corresponding to non-drivable space according to how much the values deviate from the function.

For example, if the count value is more than twice an assigned threshold value it may be considered to identify a non-drivable space.

The threshold may therefore be set as a predefined threshold value for each bin, which may be unique for each bin or the same for all bins. The threshold may be preset based on characteristics of the vehicle that the apparatus carrying out the method is fitted to, in particular the ground clearance of the vehicle.

The threshold may alternatively be defined in terms of a maximum allowable difference between the count in a bin and the count value assigned to the next lowest range bin.

Alternatively or additionally, instead of a maximum allowable difference it may be defined in terms of a maximum allowable ratio of the count of a bin to the next closest bin.

The approaches above where a comparison is made between neighbouring bins in a histogram would enable the gradient of a region to be determined, which may be combined with information about the capabilities of the vehicle to which the apparatus carrying out the method is fitted to determine if the region associated with a bin represents a drivable space. The capabilities may include the ground clearance and the break over angle and approach and departure angles of the vehicle.

The step of processing each range bin histogram to determine the closest bin may comprise scanning along a column in the histogram image starting from the end representing the lowest range. For example, in a histogram image where the bin corresponding to the lowest range is at the top row and bins that are further away are represented as lower rows, the method may scan down that histogram image until the first bin that is considered to identify a non-drivable space is identified.

Where the histogram is presented in the histogram image with the highest range at the top this step may comprise the same scanning process but by scanning up the image rather than down the histogram image.

Once a non-drivable space is identified in this way, the scanning of the histogram may stop and the scanning of the next histogram may be started. There is no need to identify non-drivable space that is beyond a space that is already identified as non-drivable. This will be repeated until all columns in the histogram image have been scanned.

The step of generating the boundary from the boundary points may comprise interpolation to determine additional boundary points between the bound points or to determine the properties of a line connecting adjacent boundary points in the image.

The method may comprise normalizing the count values in the histogram range bins to account for the orientation of the stereo camera relative to a flat horizontal plane and to account for the field of view of the camera and any distortion of the scene in the captured image.

The step of normalization may be achieved by providing a normalization image of the same dimensions as the range bin image and subtracting the normalization image from the range bin image to produce a normalized set of bin count values before processing of the counts.

The skilled person will appreciate that the capturing of a stereo pair of images may be repeated continuously, allowing the boundary points to be updated over time as new images are captured. This is important because the vehicle may be moving and this will cause the scene viewed by the camera to change. It is also important to capture a sequence of images to ensure that objects moving into a previously drivable space are detected.

The rate of processing of the captured images will depend on the frame rate of the camera and the power of any signal processing circuits used to process the captured images. Ideally, every captured stereo pair is processed in real time with little or no lag.

The method may be implemented by a signal processor that receives a feed from a stereo video camera to form a drivable space detector.

According to a second aspect the invention provides a drivable space detection apparatus for a vehicle comprising:

a receiver which receives a feed of stereo pair images from a stereo part camera of a scene around a vehicle, capturing a stereo pair of images of the scene, a first processing stage arranged in use to process the stereo pair of images to produce a depth map of the scene in which each pixel in the depth map is assigned a value that corresponds to the range of a corresponding region in the scene, the pixels arranged in a grid of rows and columns with each column of pixels in the grid corresponding to a vertically oriented set of regions in the scene and each row a horizontally oriented set of regions in the scene, a histogram generator arranged to bin the values for one or more columns of pixels in the depth image to form a corresponding histogram, each bin in the histogram having a count value that corresponds to the number of pixels in the column that have a depth within the range assigned to the bin, and a second processing stage arranged in use to process each of the range bin histograms to determine for the or each histogram the lowest range bin that is indicative that an object that represents a non-drivable region is present at a depth that lies in the range of depths assigned to the bin, and thereby identify the location of one or more boundary points that lie on a boundary of a drivable space in the scene.

The apparatus may comprise a signal processing circuit and the first and second, processing stages may comprise functional blocks of a computer program which is executed by the signal processing circuit. The histogram generator may also form a part of the signal processing circuit.

The apparatus may include a stereo pair camera that provides the feed of image.

The camera may be fixed to a front of a vehicle, in which case the boundary determines the space into which the vehicle can move when going forward.

The camera may be fixed to a rear of the vehicle

The camera may be fixed in any position on the vehicle that provides a view of a scene to the front or to the rear of the vehicle.

The apparatus may receive a feed from two stereo cameras, one providing a feed of the scene to the front of the vehicle and one providing a view of the scene to the rear of the vehicle.

Where there are two feeds, each may be processed by the signal processing means to determine a respective boundary for the scene captured by each camera.

The apparatus may include a display screen on which a boundary corresponding to the boundary points is displayed overlaid on an image of the scene captured by the stereo camera. Where there are two cameras, two images with corresponding overlays may be presented, with each one in a different region of the screen.

In a third aspect, the invention provides in combination a stereo camera and a signal processing unit which is arranged to carry out the method steps of the first aspect of the invention.

The skilled person will understand that the term image or map used in this application does not limit to a physical image or map which can be viewed by a person, but instead is intended to refer to any digital image defined as any 2D array of pixels or 2D matrix. The term pixel, likewise, is intended to be understand broadly and each pixel is defined by its (x,y) coordinates in the 2D array and its value. Each digital image will be characterised by its width and height determined from the number of the columns (c) and the number of rows (r).

Also, the skilled person will appreciate that the term depth and the term range as used in this description are interchangeable and may refer to the distance of a point, object or surface from a defined point on a vehicle, which may be a distance measured from the viewpoint of a camera that captures the stereo images or, if that is not located at an extremity of the vehicle, a distance from a known point on an extremity of the vehicle. For example, if a camera is located 1 m back from the forwardmost edge of a vehicle, any distance information determined from the processing of the images may be offset by −1 m to account for the positioning of the camera on the vehicle when providing range values.

Other advantages of this invention will become apparent to those skilled in the art from the following detailed description of the preferred embodiments, when read in light of the accompanying drawings.

DETAILED DESCRIPTION OF THE INVENTION

Figure 1:
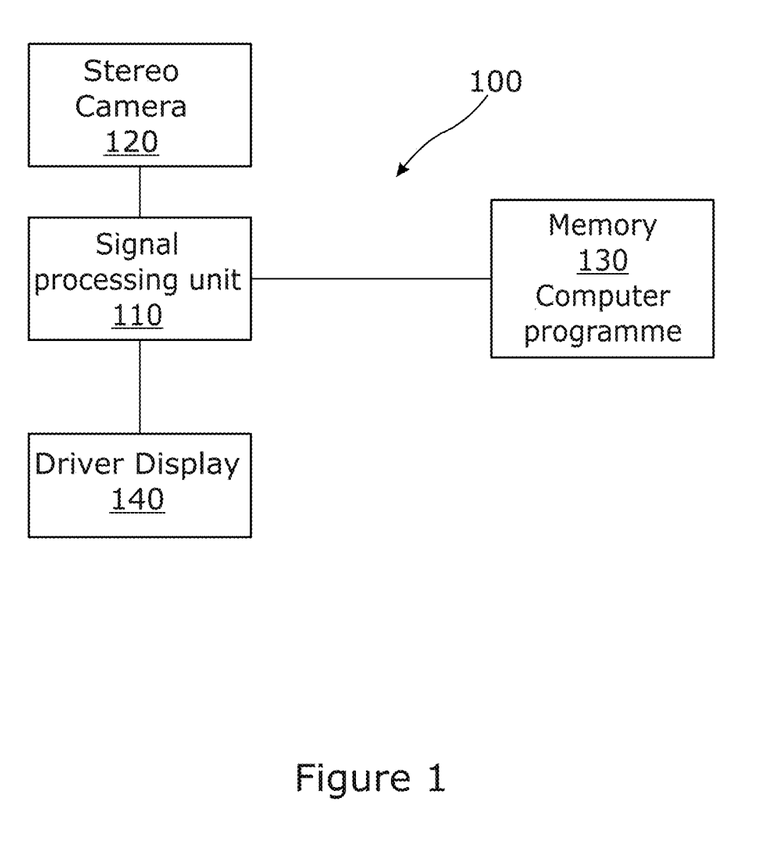
FIG. 1 is a block diagram of a drivable space detection apparatus that may be fitted to a vehicle.

FIG. 1 is an overview of an embodiment of a non ally drivable space detection apparatus 100 which may be fitted to a vehicle. The main features of the detector are a processing unit 110 which defines various processing stages and which receives a feed from a stereo video camera 120 fitted to a host vehicle (not shown) such as a passenger car. The camera 120 faces forwards in order to capture the scene to the front of the vehicle in this example. It may in other examples face to the rear of the vehicle.

The camera 120 captures a stereo pair of images of a scene to the front of the vehicle into which the vehicle could move, and will periodically capture fresh images every few seconds or fractions of a second. The Z axis of the camera field of view, corresponding to depth, is aligned with the front to rear centre line of the vehicle, so that as the vehicle drives straight ahead it will move along this Z axis. A memory stores 130 program instructions which cause the processor to process the images from the feed to determine a boundary of the drivable space. This memory 130 is also used to temporarily store the images that are being processed and intermediate images produced during the processing. The device in this example also includes a display 140 on which images can be presented to the driver of a vehicle. Of course, the camera and display could be omitted, with the processor being fed with a camera that forms part of another system, and likewise it may be sufficient simply to output data which can be fed to a display of another system or used for some other function.

Figure 2:
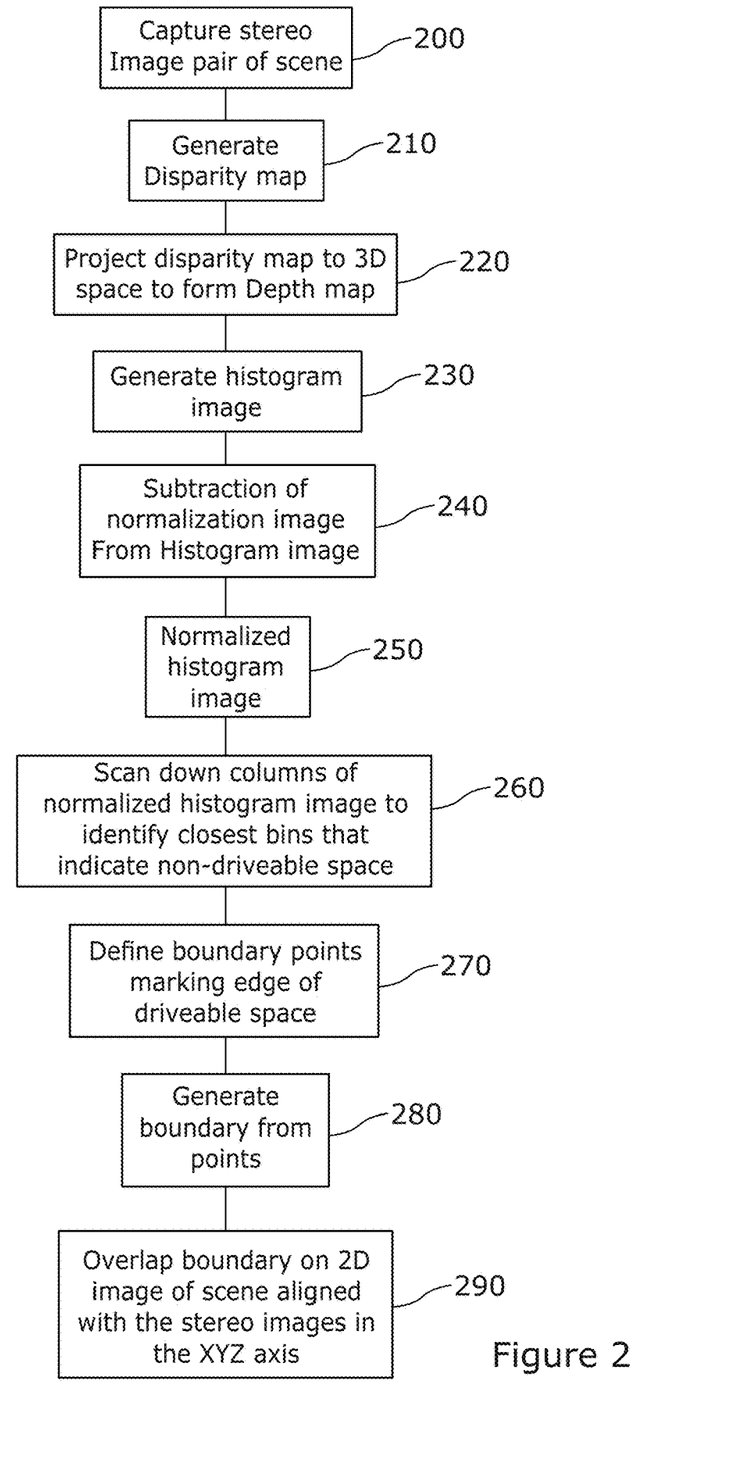
FIG. 2 is detailed schematic showing the key steps in a method of determining the boundary of a drivable space performed during the operation of the apparatus of FIG. 1.

FIG. 2 is a flowchart showing the method steps performed by the processor when determining the location of the boundary and ultimately generating a boundary which is overlaid on a 2D image of the scene and presented to a driver on a display screen.

Figure 3A:
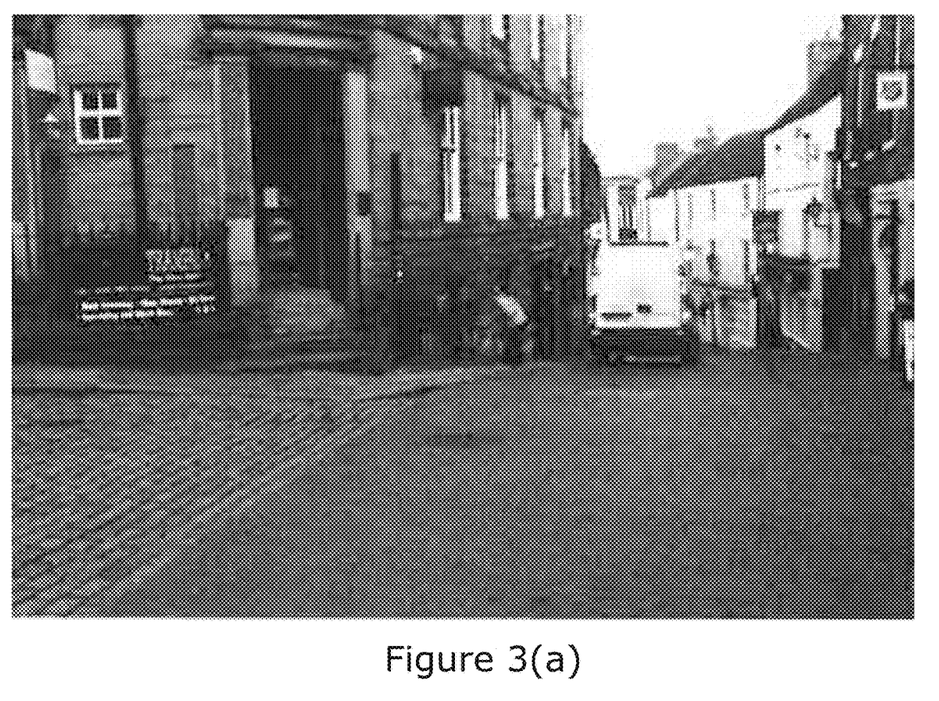
FIG. 3(a) and is a stereo pair of images of a scene.
Figure 3B:
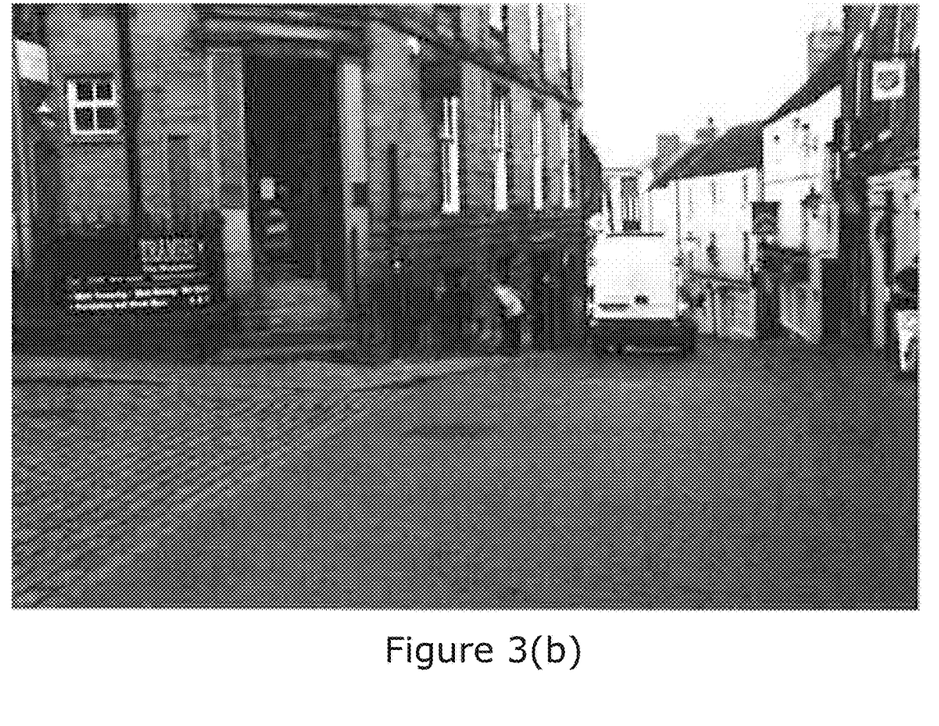

The camera initially acquires 200 a stereo pair of digital images of a common scene, each representing a 2D array of pixels. Each pixel in an image of the pair is defined by its (x,y) coordinates and has a value ranging from 0 to 255. The images have the same width and height and as such have the same number of columns (c) and the same number of rows (r). A typical stereo image pair of a roadscene is shown in FIGS. 3(a) and 3(b). The images are black and white in this example.

Having captured the stereo pair of images, they are fed to a first signal processing stage of the signal processing unit which creates 210 a disparity map, or parallax map, using Semi-Global Block Match (SCBM). The map has a (D) of height R (rows), and width C (columns), and can be visually represented as a digital 2D image of the same number of columns and rows as the stereo images in FIG. 4. Disparity is inversely proportional to range Z=fB/Disp where Z is range (m), f is focal length (px), B is baseline between cameras (m) and Disp is disparity (px). Disparity is defined as the difference in observed X-position of a corresponding point in the left and right image i.e. Disp=$|X_L-X_R|$. Therefore, for parallel cameras appoint infinitely far away has a disparity of 0.

Figure 4:
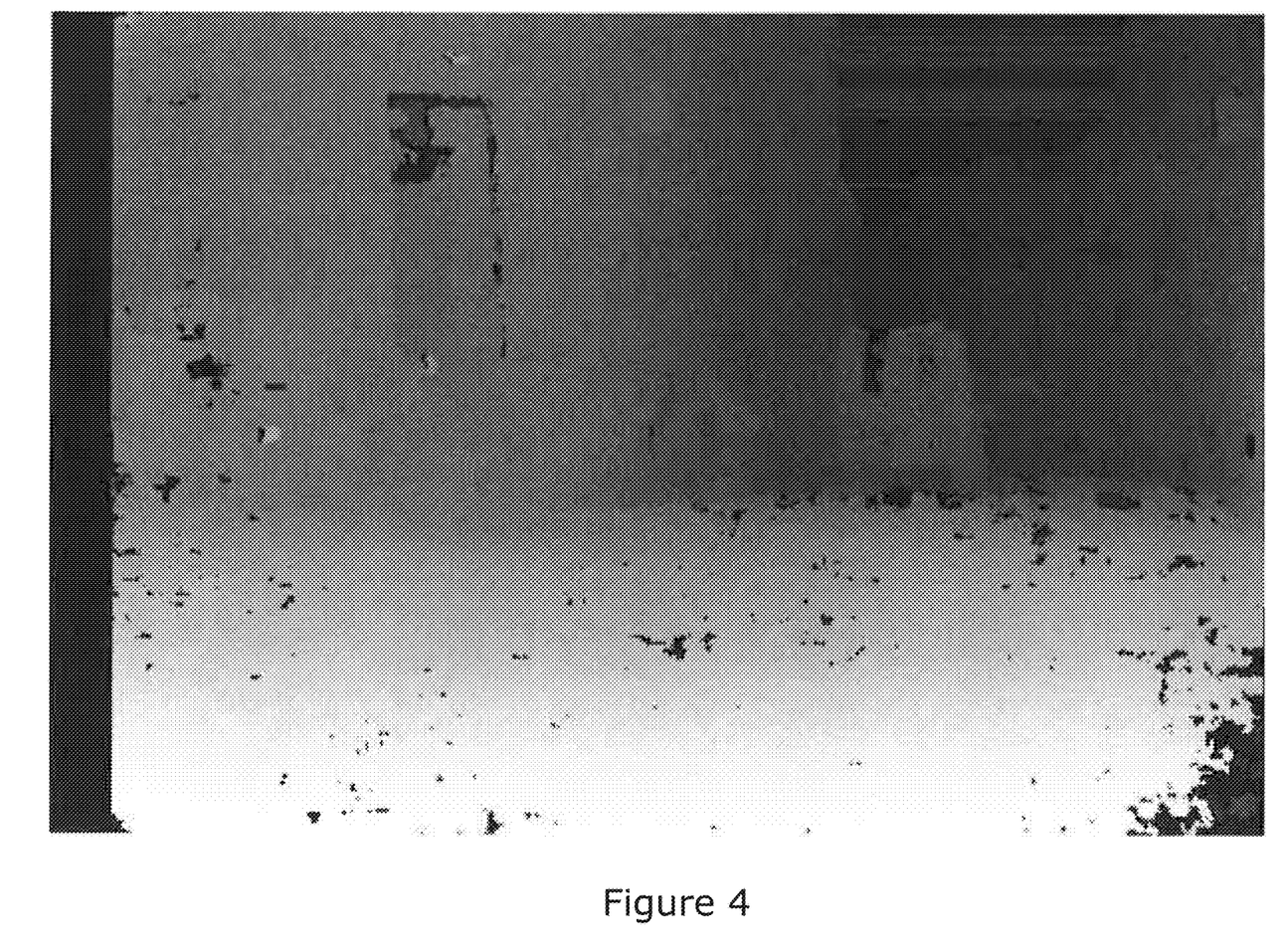
FIG. 4 is a dense disparity map created from the two images of FIGS. 3(a) and 3(b) from which a depth map can be generated by projection into a 3D space and extracting the values for range Z or each region.

In the exemplary disparity map image, pixels which are darker represent distances from the camera that have a low value because there is a low amount of observed parallax between the two images at that point in the scene, and pixels which are lighter have larger disparity values due to greater amounts of observed parallax. Other pixels are represented as differing shades of grey depending on the associated disparity in the stereo images.

Having formed the disparity map, the map is then projected to 3D points. The applicant provided a signal processing unit. This generates a 3-channel matrix of 3D points (Pt3D) of the same dimensions of R and C so that D(r,c)=>Pt3D(r,c,:);

where:
X=Pt3D(r,c,0);
Y=Pt3D(r,c,1);
Z=Pt3D(r,c,2).

The values of Z form 220 a depth map of the regions in the scene in which each pixel in the range in the depth map is assigned a value that corresponds to the range Z of a corresponding region in the scene, the pixels arranged in a grid of rows and columns with each column of pixels in the grid corresponding to a vertically oriented set of regions in a 2D image of the scene as viewed by the stereo camera and each row a horizontally oriented set of regions in the 2D image of the scene.

Using the Z values of the dense depth map, the signal processing unit next scans through all rows of each column in the range image, in effect a 2D matrix of Z, and counts the values that fall within a given range-bin, effectively creating 230 a complete histogram of range, Z defined by a set of histograms which each correspond to a column in the range image. Of course, only a subset of all the columns needs to be processed if it is acceptable to form a boundary image, but it is preferred to analyse all the pixels in the range image.

Each column-histogram may be visualized as a further digital image, again with the same dimension R and C. Each column is defined by the bins of one histogram, with the top row corresponding to the bin for the smallest range and the rows running down the image corresponding to bins of increasing range. The number of bins in this example therefore corresponds to the number of rows R in the dense depth map.

Figure 5:
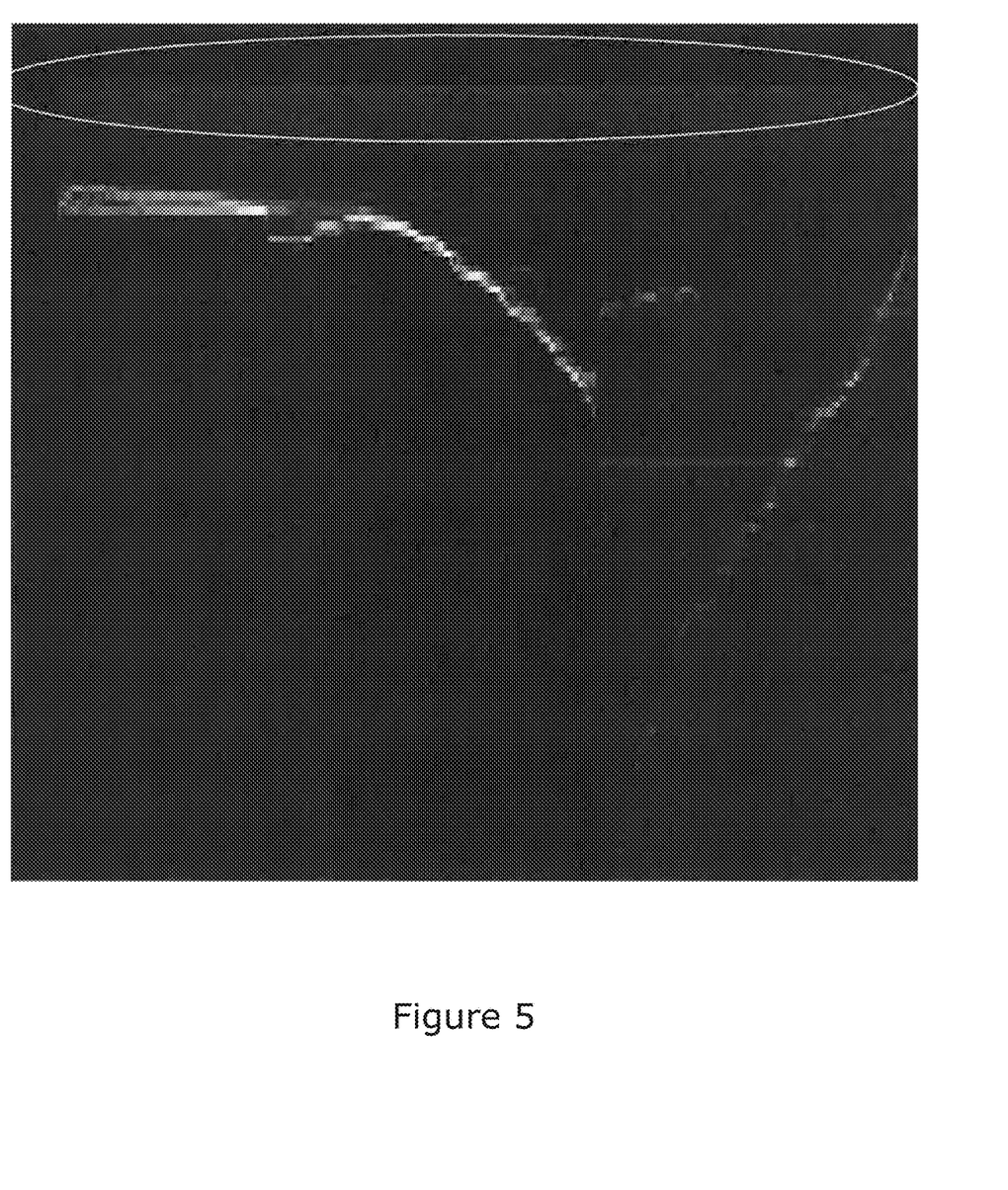
FIG. 5 is a representation of a set of range bin histograms as a 2D image where each column of pixels corresponds to a histogram and where the lowest range bin is at the top of the image.
Figure 6:
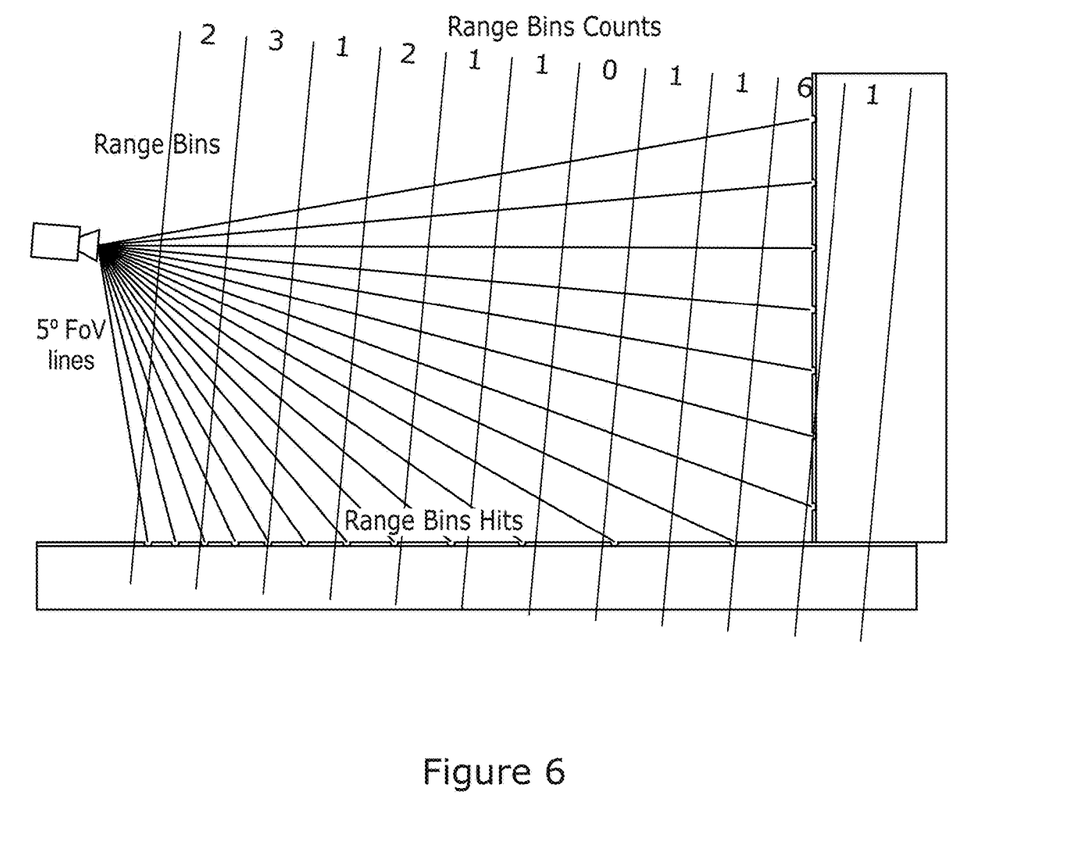
FIG. 6 is a diagram of 3D point distribution to range bins marked with field of view (FOV) lines at 5 degree intervals to show constant linear resolution leading to non-linear range points on a flat plane.

In the sample 2D histogram image shown in FIG. 5 high counts are represented as pixels that are lighter in shade than low counts which are represented by a darker shade. Every time there are multiple points at the same range or range-bin they accumulate in that given range-bin. This is illustrated in FIG. 6 which is a diagram of 3D point distribution to range bins for one of the columns in FIG. 5 that has been marked with field of view (FOV) lines at 5 degree intervals to show that a constant linear resolution of the range bins leads to a non-linear count of range points in each bin on a flat plane. It will be apparent that, for a camera with a constant angular resolution that looks down onto a road from a location on a vehicle spaced above the road, there are more range 'hits' closer to the camera and less further away for a scene which includes a perfectly flat and horizontal drivable surface.

Note also in FIG. 6 that an edge of a non-drivable space represented by the vertical dashed line will lead to a high count for the corresponding range bin compared to the adjacent flat drivable space. In this case the count is 6 times higher than it is for the flat drivable space.

Before any analysis of the counts of each bin is performed, the effect of the camera location and alignment above the surface is next removed in order to reliably count the occurrences of hits at the same range.

At this stage the exact camera pitch may be known allowing a precise function to be fitted to the range bin count corresponding to a flat plane. If it is unknown, instead of calculating the expected number of pixels in a given range-bin given the camera parameters (field of view, resolution) and the pitch of the camera we simply fit a function to the range-bin count of a known flat plane observed in the data. This is shown in FIG. 7.

Figure 7:
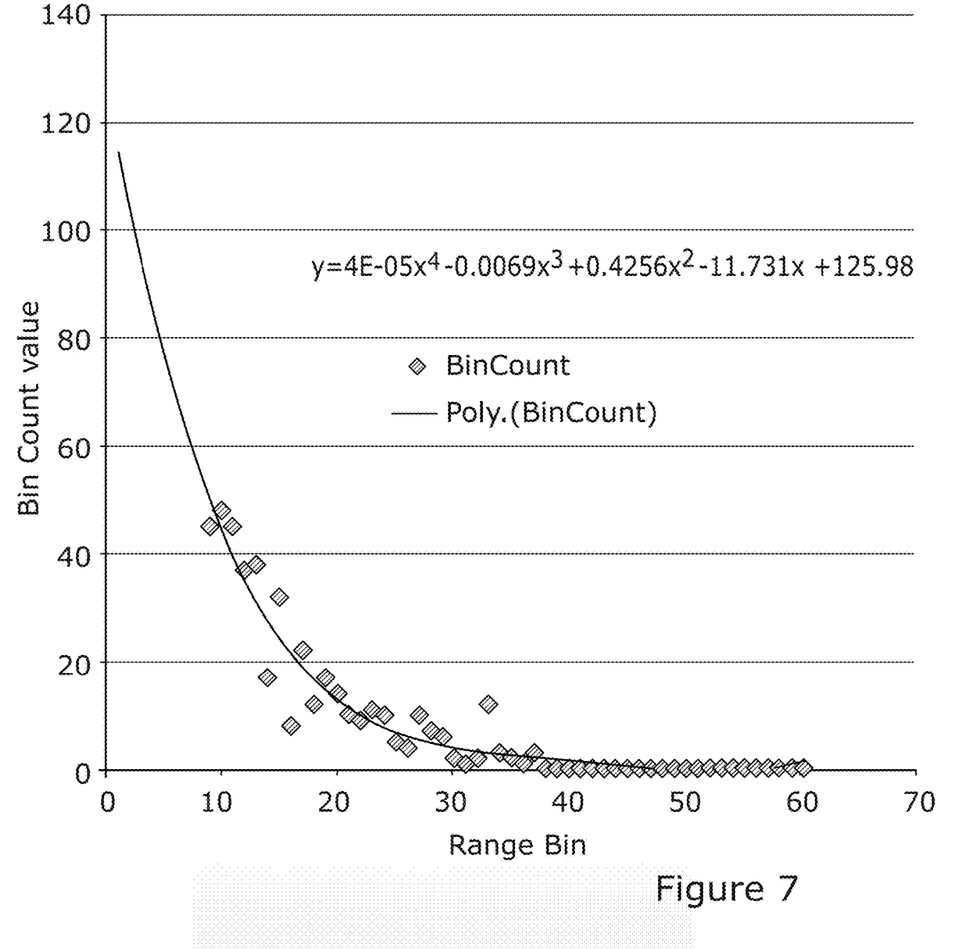
FIG. 7 is an exemplary function fitted to real data to model the expected range-bin count value for the given camera configuration.
Figure 8:
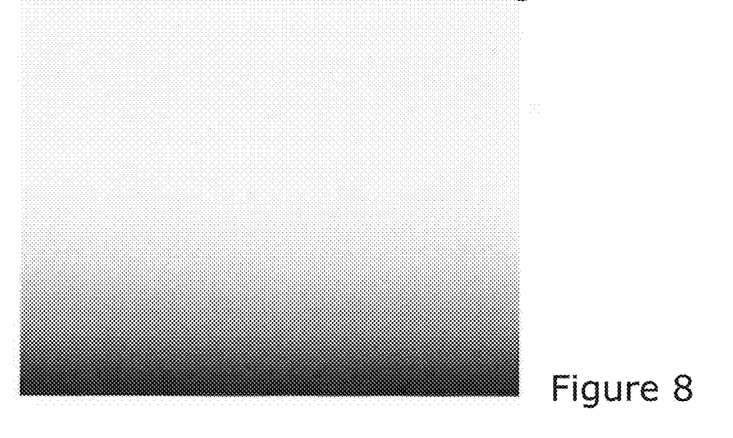
FIG. 8 is a 2D image of a normalization mask created from a fitting function.

In a next step, using the function previously calculated and shown in FIG. 7, the drivable space detector generates a 2D mask that represents what a range-bin histogram image would look like using a perfect stereo algorithm (no noise) observing a flat plane. This is shown in FIG. 8. Again, note that in the image white is a high value and black a low value. The image has closer range at the top and more distant range at the bottom, with each column corresponding to a histogram for a vertical strip of pixels in the scene captured in the original stereo images.

Figure 9:
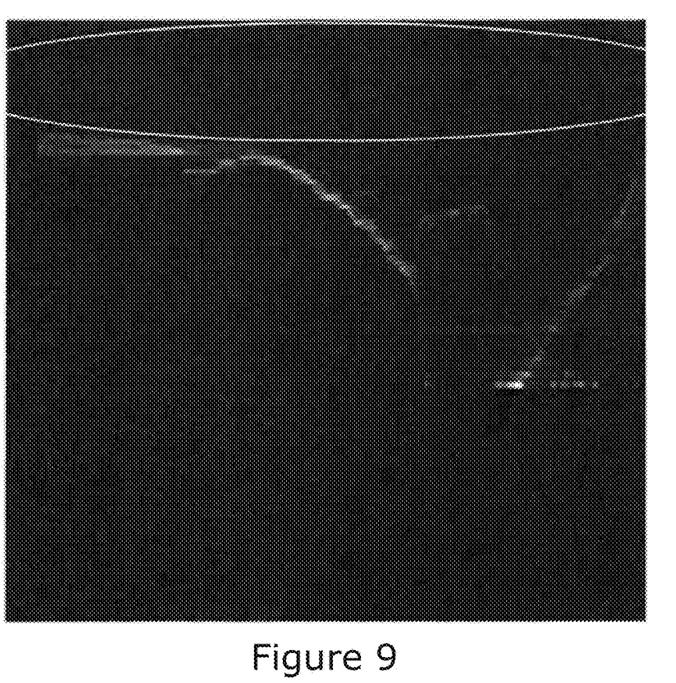
FIG. 9 is a representation corresponding to FIG. 6 in which the range bin counts have been normalized.
Figure 10:
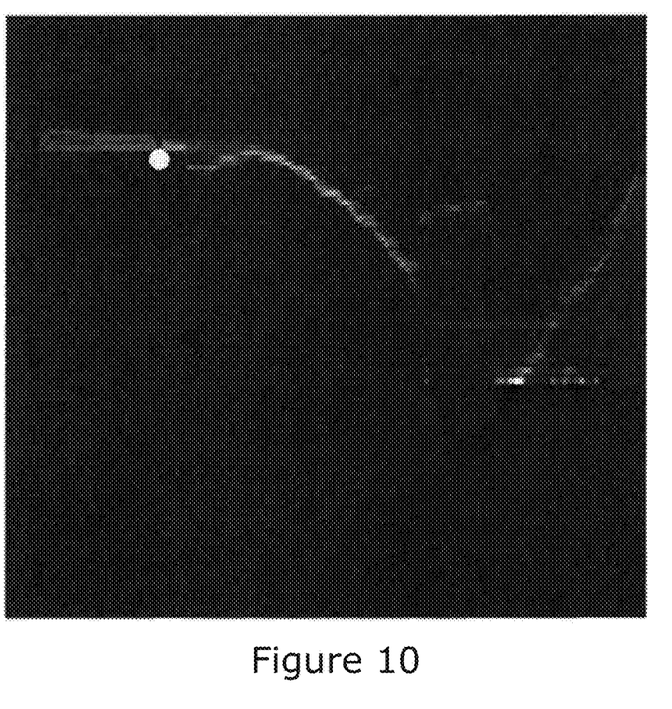
FIG. 10 shows the step of scanning down a histogram in the image of FIG. 9 until the range bin with the lowest range until a threshold crossing corresponding to a non-drivable space is encountered, indicated by point P.
Figure 11:
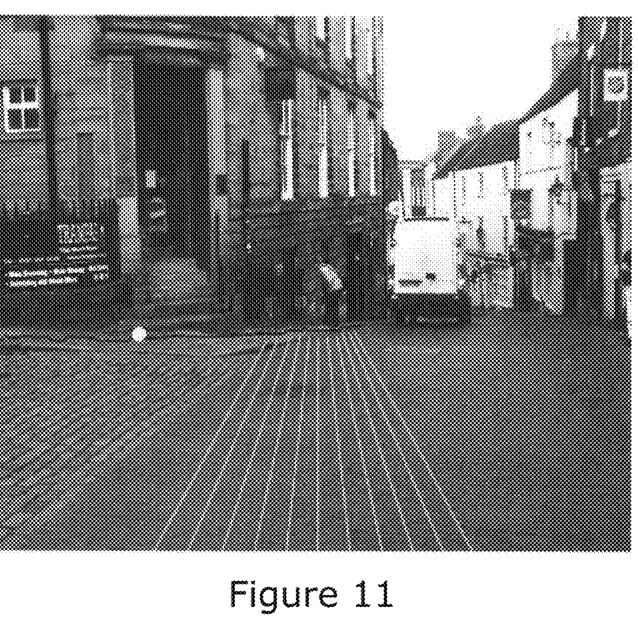
FIG. 11 shows the point P marked on a 2D image of the scene created from the stereo pair of images, where the point P marks a point on a boundary of a drivable space.

Taking the range-bin histogram of FIG. 5, and subtracting 240 from it by the normalisation map, FIG. 8, a normalised range-bin image is obtained 250. This is shown in FIG. 9, where it is possible to see that the short range-bins are no longer a feature in the image. Again, this image represents a set of histograms, each visualized as a column.

In a next step 260, the drivable space detector scans down a column of pixels in the histogram image of FIG. 9 until a range bin is found which indicates a region of non-drivable space. This scanning process allows for easy detection of pixels (counts) that exceed a set threshold as a simple and robust indicator of non-drivable space. The threshold may be uniquely defined for each range bin or simply set as a maximum allowable variation form the function set out in FIG. 7. In this example given here, the drivable space detector may use a threshold of 2, i.e. there must be twice as many pixels in that range-bin than expected for a flat plane. Range-bin size and threshold level effectively set the sensitivity of the detector. Large range-bins will smooth the data but may miss smaller objects as they proportionally make up a smaller percentage of the counts in a given range-bin. A larger threshold applied to the normalised range-bin histogram image will result in only taller objects being detected.

A set of boundary points may then be defined 270 from the lowest range bins. Each column of the range histogram maps directly to the same column in the original image. During the creation of the range histogram from the disparity map a lookup table may be created that relates the image row to range bin. Therefore it becomes simple to transform a point in the range histogram image back into camera space by using the column index and looking up the corresponding image row for a given range bin from the lookup table. This allows for visually representing the location on the source imagery.

In a last step, the boundary points are fitted to a boundary 280 which is then displayed to the driver 290 on the display 140 over a 2D image of the scene as viewed from the viewpoint of the stereo camera.

The method of determining a drivable space set out above is designed to detect objects that lie above a 3D plane in front of a moving vehicle fitted with a calibrated stereo camera. It requires no training data or any forms of machine learning, therefore it is not limited to a given class of objects so is only defined by the size of the objects the system should identify.

Processing is performed in 2D on 3D data, i.e. a 2D matrix representation of the 3D data, range (Z coordinate), of each pixel is used to determine if a given pixel falls within a range-bin of a given size and if that pixel contributes to the sum of that range-bin exceeding the expected acceptable limit for a flat plane it is identified as an object that cannot be driven over. Range-bins that fail the test are flagged as objects and used to illustrate the limits of the drivable regions by generating a boundary.

In other embodiments, the boundary points may instead be fed to an input of a driver control system for a semi-autonomous or autonomous vehicle.

Figure 12:
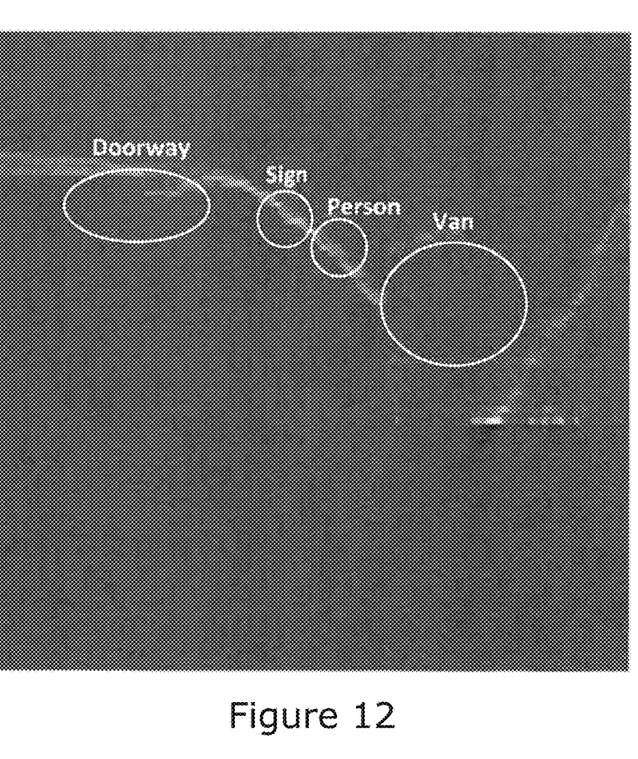
FIGS. 12 to 14 show the location of four identifiable features that each mark an edge of the drivable space in a normalized range bin histogram representation, the dense disparity map and the final overlaid 2D image.
Figure 13:
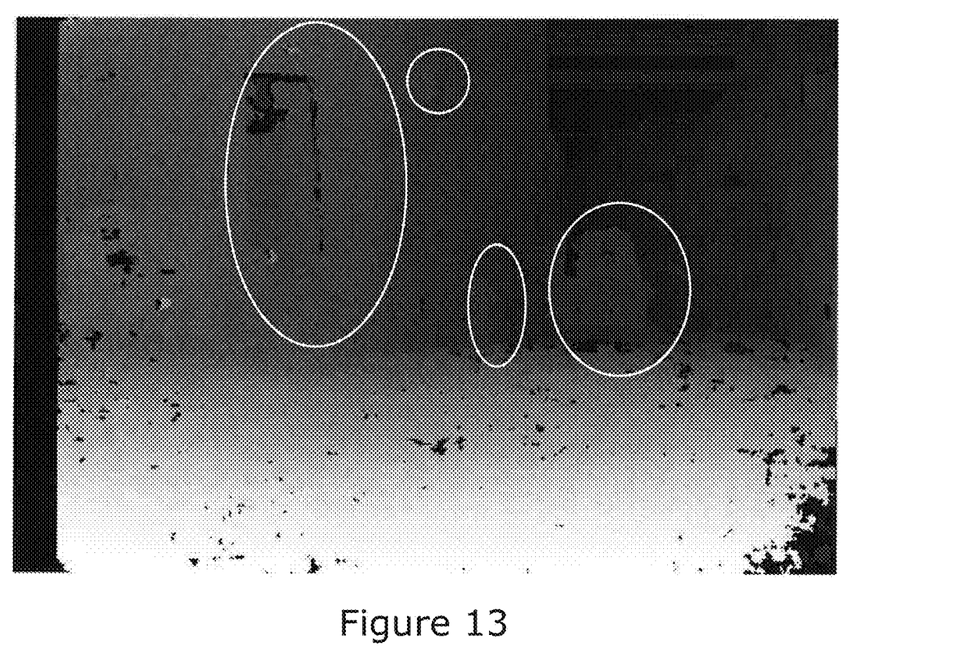
Figure 14:
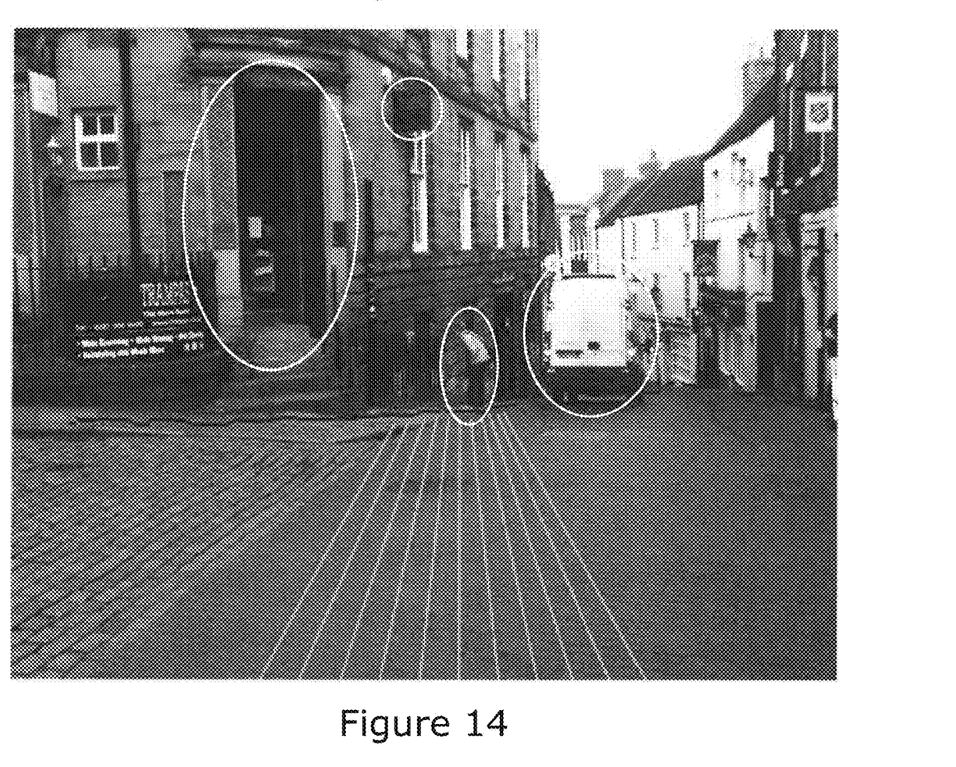

To further explain the method steps performed according to an aspect of the invention in the detailed embodiment, FIGS. 12 to 14 have been provided which highlight various objects with the scene in the normalised range-bin histogram image, the disparity depth map and the source image from the left camera from the stereo-camera pair with boundaries annotated in the final overlaid 2D image of FIG. 14.

In accordance with the provisions of the patent statutes, the principle and mode of operation of this invention have been explained and illustrated in its preferred embodiments. However, it must be understood that this invention may be practiced otherwise than as specifically explained.

What is claimed is:

1. A method of determining the characteristics of a scene around a vehicle comprising:
    capturing from a stereo camera a stereo pair of images of the scene,
    processing the images to produce a depth map of the scene in which each pixel in the depth map is assigned a value that corresponds to a range of a corresponding region in the scene, the pixels arranged in a grid of rows and columns with each column of pixels in the grid corresponding to a vertically oriented set of regions in the scene and each row a horizontally oriented set of regions in the scene, binning the values for one or more columns of pixels in the depth map to form a corresponding histogram for each column, wherein the columns provide a 2D histogram image, each bin in each histogram having a count value that corresponds to the number of pixels in the column that have a depth within the range assigned to the bin, scanning the count values in the one or more range bin histograms from an end representing a lowest range to determine for each histogram a bin having a lowest range that is indicative that an object that represents a non-drivable region is present at a depth that lies in the range of depths assigned to the bin, and thereby identify the location of one or more boundary points in a set of boundary points that lie on a boundary of a drivable space in the scene, wherein the scanning of each respective histogram is stopped once the boundary point is detected and the scanning proceeds to a next histogram, and determining from a set of boundary points a complete boundary that extends across all columns in the 2D histogram image between boundary points, whereby a boundary line represents an edge of a safe drivable space in the scene.

2. A method according to claim 1 which further comprises constructing a 2D image of the scene, marking the boundary points or the boundary line onto the 2D image, and presenting the 2D image with the markings on a display screen.

3. A method according to claim 1 which further comprises generating a lookup table that relates the image row of the 2D image to the corresponding range bin.

4. A method according to claim 1 in which the step of processing the images to produce the depth map comprises creating a disparity image using a dense stereo algorithm, plotting a 2D matrix of values Z in a 3D projection of the disparity image where a transformation is based on a Z axis being aligned with a central axis of a camera field of view that captures a stereo image pair, and subsequently generating the range bin histogram by scanning through all rows of each column in the 2D image and counting the values that fall within a given range bin, effectively creating a histogram of range, Z.

5. A method according to claim 1 in which the step of processing each of the range bin histograms to determine which is the lowest range bin which represents non-drivable space comprises comparing the count value assigned to a bin to a predefined threshold count value assigned to the bin, and flagging that the bin identifies a region in the scene that is non-drivable if the value exceeds the threshold.

6. A method according to claim 1 in which the step of processing each range bin histogram to determine the lowest range bin comprises scanning along a column in the histogram image starting with the lowest range bin until a bin corresponding to non-driveable space is found.

7. A method according to claim 1 further comprising normalizing the count values in the histogram range bins to account for an orientation of the stereo camera relative to a flat horizontal plane and to account for the field of view of the stereo camera and any distortion of the scene in the captured image.

8. A drivable space detection apparatus for a vehicle comprising:

a receiver which receives a feed of stereo pair images from a stereo pair camera of a scene around a vehicle, a first processing stage arranged in use to process the stereo pair of images to produce a depth map of the scene in which each pixel in the depth map is assigned a value that corresponds to a range of a corresponding region in the scene, the pixels arranged in a grid of rows and columns with each column of pixels in the grid corresponding to a vertically oriented set of regions in the scene and each row a horizontally oriented set of regions in the scene, a histogram generator arranged to bin the values for one or more columns of pixels in the depth image to form a corresponding histogram for each column, wherein the columns provide a 2D histogram image, each bin in each histogram having a count value that corresponds to the number of pixels in the column that have a depth within the range assigned to the bin, and a second processing stage arranged in use to scan the count values for each of the range bin histograms from an end representing a lowest range to determine for each histogram the bin having a lowest range that is indicative that an object that represents a non-drivable region is present at a depth that lies in the range of depths assigned to the bin, and thereby identify the location of one or more boundary points in a set of boundary points that lie on a boundary of a drivable space in the scene, wherein the scanning of each respective histogram is stopped once the boundary point is detected and the scanning proceeds to a next histogram, wherein the second processing stage is further arranged in use to determine from the one or more boundary points a complete boundary that extends across all columns in the 2D histogram image between boundary points, whereby a boundary line represents an edge of the drivable space in the scene.

* * * * *